Figure 1:
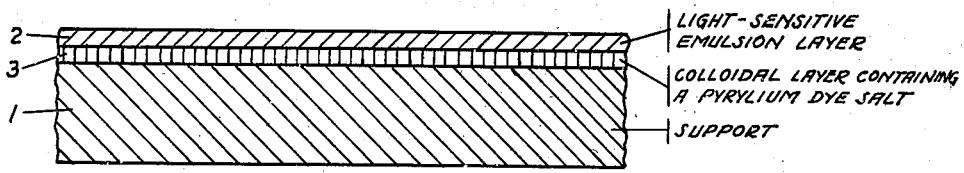

Patented Feb. 8, 1949

2,461,484

UNITED STATES PATENT OFFICE 2,461,484

PYRYLIUM DYE SALTS AS FILTER AND ANTIHALATION DYES IN PHOTOGRAPHIC MATERIALS

Thomas R. Thompson, Binghamton, N. Y., assignor to General Aniline & Film Corporation, New York, N. Y., a corporation of Delaware Application April 17, 1945, Serial No. 588,850

9 Claims. (Cl. 95—9)

This invention relates to filter and anti-halation dyes for photographic materials, and particularly to pyrylium dye salts as photographic filter and anti-halation dyes.

It is known in the art of making photographic materials such as multilayer color films, that color separation by the various layers is facilitated by the use of filters either incorporated directly into the emulsion layers or added as adjacent layers in the appropriate sequence. For example, blue light passing through the non-sensitized blue sensitive layer must be absorbed by a minus blue (i. e., yellow) filter before it reaches the green sensitive and red sensitive layers, which are likewise sensitive to blue light. Similarly, green absorbing filters are frequently desirable in order to obtain a better separation between the green and the red sensitive layers. Other filters with special characteristics are occasionally used, depending upon the absorption desired.

In a similar manner, colored light-absorbing layers are frequently used adjacent to a photographic support in order to prevent light scattering or halation effects caused by reflection of light rays from the support onto the sensitive layer. Such layers are commonly known as anti-halation layers.

In order to perform their desired functions, filter and anti-halation dyes must be stable in a colloid carrier. They must be non-diffusing and readily removable in the customary processing baths. Moreover, it is essential that they have no injurious effects, such as fogging or desensitizing action, on the emulsion layers. Most dyes suggested in the past as suitable for filter layers fail to fulfill completely all of the above requirements.

The primary object of the present invention is to provide a class of pyrylium dye salts suitable as filter layers and anti-halation layers for photographic materials.

Another object is to provide photographic elements dyed with pyrylium dye salts, the color of which is readily dischargeable in the usual photographic processing baths.

A further object is to provide filter and anti-halation layers which have no deleterious effect on the photographic properties of the film.

Other objects and advantages of this invention will be apparent by reference to the following specification in which its preferred details and embodiments are described.

I have discovered that dyes having a pyrylium structure and containing an inorganic or organic acid radical, are particularly adaptable as filter and anti-halation layers in photographic materials. The desired result can be achieved by the use of any pyrylium dye salt whether unsubstituted or substituted by a benzo or naphtho group. The pyrylium dye salts are very intense in color, and therefore may be used as photographic filter and anti-halation dyes in lesser amounts than the dyestuffs usually employed. Furthermore, they are completely and irreversibly decolorized in photographic processing baths, that is, the color of the dyes will not return in subsequent processing steps. The solubility of the pyrylium dye salts may be effectively controlled by varying the anion. This characteristic is of importance, inasmuch as the solubility of the dyes must be varied to fit the use thereof in particular media. For instance, if the dyes are to be used in gelatin or other water permeable colloids, water solubility of the dye is desired. For this purpose, the chloride salt, which for example is more soluble in water than the perchlorate, would recommend itself for use. On the other hand, for alkali-soluble resin coatings, alcohol solubility is desired, and this can be achieved by using an organic acid radical such as, for example, the acetate.

After the soluble dye is mixed with gelatin or other suitable colloidal carrier, a small quantity of an inorganic salt solution such as $NaClO_4$, $KI$ or $NH_4SCN$, may be added. This serves to reduce the water solubility of the dyes and thereby ensure that the dyes will be more tenaciously retained by the colloidal carrier.

I have also found that the pyrylium dye salts have sharp "cut-offs" in their absorption curves. This characteristic makes them particularly useful in the preparation of light filters in the form of gelatin foils or other suitable film forming substances known to the art for use in photography or industrial applications where light of a definite quality is desired.

The pyrylium dye salts contemplated by the present invention are characterized by a structure corresponding to the following general formulae:

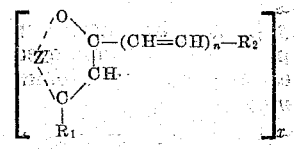

and

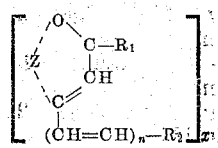

wherein $R_1$ may be hydrogen, alkyl, e. g., methyl, ethyl, propyl, butyl or any other aliphatic radical containing up to 24 carbon atoms, acyl, e. g., acetyl, propionyl, butyryl, lauryl, palmityl, stearyl and the like, aromatic, i. e., an unsubstituted aryl radical, e. g., phenyl, naphthyl, anthranyl, diphenyl, or substituted aryl radical containing one or more substituent groups which may be the same or different such as, for example, alkyl and acyl radicals of the same value as above, alkoxy, e. g., methoxy, ethoxy, propoxy, etc., alkylamino, e. g., methylamine, ethylamine, propylamine, butylamine, etc., dialkylamino, e. g., dimethylamino, diethylamino, dipropylamino, etc., hydroxy, carboxylic or sulfonic acid groups, methylene dioxy and the like, $R_2$ is an aromatic radical of the same value as $R_1$, Z represents a vinylene, phenylene, or naphthylene radical necessary to complete a pyrylium, benzopyrylium, or naphthopyrylium ring structure, respectively. Said vinylene, phenylene and naphthylene radicals may be substituted by an alkyl, alkoxy, hydroxy, carboxylic or sulfonic acid group, or aromatic radical as above, X represents an acid radical, e. g., Cl, Br, I, $SO_4ClO_4$, $C_2H_3O_2$ $$SO_3CH_2COOH$$

$SO_3C_6H_4CH_3$, $FeCl_4$, and the like, and $n$ represents 0, 1 or 2.

The methods for the preparation of pyrylium dye salts are given in the literature. One general method consists of condensing a pyrylium salt, which contains a reactive methyl group either in ortho or in para position to the oxygen atom of the pyrylium ring with an aromatic aldehyde in the presence of an inorganic acid. Other suitable methods are described by Walker and Heilbron, J. C. S. 127, pp. 687–693 (1925); Heilbron and Zaki, J. C. S. p. 1904 (1926); Buck and Heilbron, J. C. S. 121, p. 1204 (1922); and Robinson, et al., J. C. S. 125, pp. 209–219–221 (1924).

In addition to the above pyrylium salts, certain intermediates lead to the formation of pyrylium salts containing a reactive methyl group under the condition of the dye condensation as, for example, o-hydroxybenzal acetone. Moreover, pyrylium dye salts may be made by methods not directly involving a pyrylium salt as an intermediate as described by Heilbron and Buck (J. C. S., p. 1198, 1922), where o-hydroxybenzal acetone is condensed with aromatic aldehydes and the doubly unsaturated ketone is then cyclized in acid solution to form benzopyrylium dye salts. Similarly, naphthopyrylium dye salts may be prepared by condensing, for example, 2-naphthol-1-aldehyde with a suitable styryl methyl ketone as described by Dickinson and Heilbron, J. C. S. p. 2, 1927. Pyrylium dye salts prepared by the latter synthesis have been found equally effective as anti-halation and filter dyes as the pyrylium and benzopyrylium dye salts prepared by the former synthesis.

Typical pyrylium salts containing a reactive methyl group which can be employed in the condensation reaction with an aromatic aldehyde are the following:

7,8 - dihydroxy - 4 - methyl - 2 - phenylbenzopyrylium chloride
5,7 - dihydroxy - 4 - methyl - 2 - phenylbenzopyrylium chloride
7 - methoxy - 4 - methyl - 2 - phenylbenzopyrylium chloride
5,7 - dimethoxy - 4 - methyl - 2 - phenylbenzopyrylium chloride
7 - hydroxy - 2,4 - dimethylbenzopyrylium chloride
7,8 - dihydroxy - 2,4 - dimethylbenzopyrylium chloride
5,7 - dihydroxy - 2,4 - dimethylbenzopyrylium chloride
7 - methoxy - 2,4 - dimethylbenzopyrylium chloride
4,6 - diphenyl - 2 - methylpyrylium sulfoacetate
4,6 - dianisyl - 2 - methylpyrylium sulfoacetate
2,3 - dimethyl - 7 - methoxy - 4 - phenylbenzopyrylium bromide As typical illustrations of aromatic aldehydes usable for the preparation of pyrylium dye salts, may be mentioned, benzaldehyde, p-dimethylaminobenzaldehyde, p-hydroxybenzaldehyde, p-methoxybenzaldehyde, p-diethylaminobenzaldehyde, 2,4-dihydroxybenzaldehyde, vanillin, cinnamaldehyde, p-dimethylaminocinnamaldehyde. In place of aromatic aldehydes, the intermediates known in the art of cyanine dye manufacture may be used as, for example, 2-($\beta$-acetanilidovinyl) benzothiazole ethiodide, 2-formylmethine-1,3,3-indoline, ethyl orthoformate, $\beta$-ethoxyacrolein diethylacetal, and the like.

The pyrylium dye salts may be incorporated in gelatin or other colloidal materials such as organic esters of cellulose, polyamides, superpolyamides, polyesters, or synthetic resins such as vinyl acetal resins, polyvinyl alcohol mixed with resorcinol, polyvinyl propionaldehyde and the like. A surface active agent such as sulfated oleic acid, alkylated mono sodium benzenesulfonate, di-hexyl ester of sodium sulfosuccinate, sodium salt of an alkylnaphthalene sulfonic acid, sodium salt of tetrahydronaphthalene sulfonic acid, calcium glycerin phosphate, alkylphenylpolyethylene glycol, oleic acid ester of hydroxyethane sulfonic acid and sulfonated higher molecular weight primary or secondary aliphatic, aromatic and cyclo-aliphatic carboxy acids, may be added to effect a smoother coating. It is to be noted, however, that any commercially available surface active agent may be employed. The nature of the surface active agent is immaterial so long as it possesses wetting, dispersing and emulsifying properties, and its aqueous solutions are colorless or only slightly tinted.

The following examples describe in detail the methods for accomplishing the above objects, but it is to be understood that they are inserted merely for the purpose of illustrations and are not to be construed as limiting the scope of the invention. The parts are by weight unless otherwise stated.

EXAMPLE I 4-(4'-dimethylaminostyryl)-7-hydroxy-2-phenylbenzopyrylium chloride

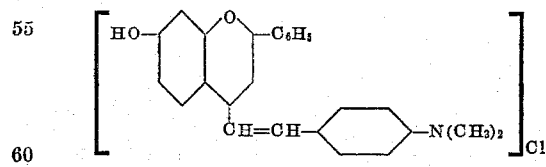

A mixture of 5.47 parts of 7-hydroxy-4-methyl-2-phenylbenzopyrylium chloride (prepared according to Buck and Heilbron, J. C. S., page 2527, 1923), 3.50 parts of p-dimethylaminobenzaldehyde, 60 parts by volume of acetic acid (glacial), and 30 parts by volume of acetic anhydride was heated at reflux in a wax bath for thirty minutes. The reaction mixture was cooled in ice and 200 parts by volume of ether slowly added with stirring. Crystals appeared as metallic streaks on the side of the flask. After standing for a short while in the cold, the product was filtered and after digestion and washing with ether amounted to 8.02 parts. The methanol solution is blue.

A gelatin coating was made by adding one part by volume of a 1% methanol solution of the dye to 8 parts by volume of a 5 to 8% solution of gelatin in water and casting on a film base. The coating thus obtained is blue. The color is readily discharged when the coating is immersed in common photographic developers and does not return in the presence of acid short-stop or hypo.

The bromide of this dye was made by adding aqueous potassium bromide to an alcoholic solution of the chloride. The bromide salt is less soluble in alcohol or water than the chloride.

Example II

2',4'-dihydroxy-2-styrylbenzopyrylium chloride

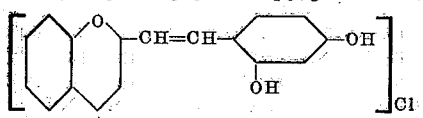

A solution of 1.38 parts of 2,4-dihydroxybenzaldehyde and 1.62 parts of o-hydroxybenzalacetone in 5 parts by volume of formic acid was saturated with hydrogen chloride. After standing thirty minutes, the dye was precipitated with ether. Purification was effected by redissolving in formic acid and reprecipitating with ether. This dye dissolves in alcohol to give a magenta colored solution with an absorption maximum of 520 mμ. A gelatin coating is magenta in color and the color is readily discharged by photographic developing solutions.

Example III

4'-hydroxy-2-styrylbenzopyrylium chloride

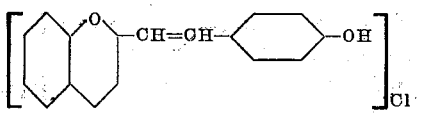

A solution of 1.1 parts of p-hydroxybenzaldehyde and 1.5 parts of o-hydroxybenzalacetone in 5 parts by volume of formic acid was saturated with hydrogen chloride and purified as in Example II.

Gelatin coatings of this dye vary with the pH. In an acetic acid coating such as pH 3.4, the color is magenta, while when the pH is 5.5 to 7.5, the color is blue. This blue color is attributed to the quinone form:

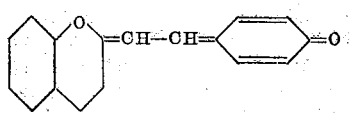

Strong alkali discharges the color.

Example IV 7-hydroxy-4-(4'-hydroxystyryl)-2-phenyl-benzopyrylium chloride

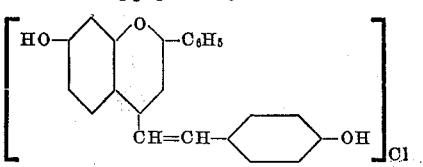

A hot suspension of 2.2 parts of 7-hydroxy-4-methyl-2-phenyl-benzopyrylium chloride and 1.0 part of p-hydroxybenzaldehyde in 50 parts by volume of methanol was saturated with hydrogen chloride and allowed to stand overnight. The resulting crystals were purified by boiling out with acetic acid. The yield obtained was 2.75 parts. The dye is precipitated when the red alcoholic solution is mixed with an 8% gelatin solution. If, however, a little sodium carbonate is incorporated in the gelatin solution a soluble blue color results. The blue color of the gelatin coating is discharged by the developer. The structure of the blue dye is believed to be as follows:

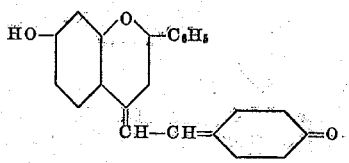

Example V

3',4'-methylenedioxy-2-styrylbenzopyrylium chloride

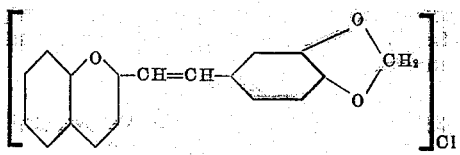

A solution of 1.6 parts of a o-hydroxybenzalacetone and 1.5 parts of piperonal in 25 parts by volume of acetic acid was treated with hydrogen chloride for ten minutes. After standing one hour, the crystals were filtered and washed with acetic acid and finally with ether. A 2% methanol solution of this dye is magenta with an absorption maximum of 520 mμ. A suitable gelatin coating was made with the gelatin acidified with acetic acid to pH 4.5. The magenta color of the coating is rapidly discharged by photographic developing solutions.

Example VI

4'-methoxy-2-styrylbenzopyrylium chloride

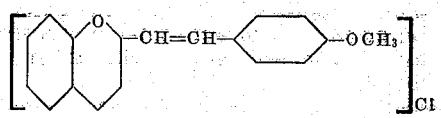

A mixture of 1.60 parts of o-hydroxybenzalacetone and 1.45 parts of p-anisaldehyde was dissolved in 25 parts by volume of acetic acid by warming. The solution was then cooled and treated with hydrogen chloride for ten minutes. After standing overnight, the product was precipitated by cooling and addition of ether. The yield of dye was 2.57 parts. A 2% alcoholic solution is red with an absorption maximum at 510 mμ. The gelatin coatings (pH 4.5) of this dye are red and readily bleached with developer solutions.

Example VII

4'-dimethylamino-4-styryl-2-phenyl-7-methoxy-benzopyrylium chloride

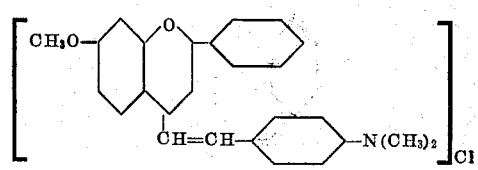

A mixture of 2.6 parts of 7-methoxy-4-methyl-2-phenyl-benzopyrylium chloride, 1.7 parts of p-dimethylaminobenzaldehyde, 30 parts by volume of acetic acid and 15 parts by volume of acetic anhydride was heated at reflux for thirty minutes. After standing, the crystals were separated and washed with acetic acid and then with ether. The gelatin coating is blue.

EXAMPLE VIII

*7-hydroxy-4'-methoxy-2-phenylbenzopyrylium chloride*

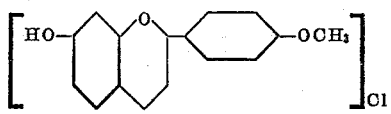

A solution of 1.4 parts of 2,4-dihydroxybenzaldehyde and 1.5 parts of 4-methoxyacetophenone in 15 parts by volume of methanol was saturated with hydrogen chloride and allowed to stand overnight. The crystals were filtered and washed with ether.

A gelatin coating of this dye is yellow-orange in color. The color is discharged by regular treatment with photographic developer and fixing solutions.

EXAMPLE IX

*2,4-diphenyl-4'-dimethylamino-6-styrylpyrylium sulfoacetate*

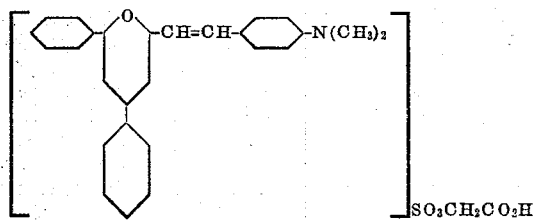

A mixture of 3.9 parts of 2,4-diphenyl-6-methylpyrylium sulfoacetate (prepared according to Schneider and Seebach, Ber. 54, 2289 (1921)), 1.5 parts of p-dimethylaminobenzaldehyde, 10 parts by volume of acetic acid and 10 parts by volume of acetic anhydride was heated at reflux for twenty minutes. After cooling, the black needles were filtered and washed with acetic acid and finally with ether. The yield was 4.05 parts.

A gelatin coating is not decolorized completely by photographic processing solutions unless the gelatin has been specially purified by treatment with hydrated aluminium oxide. However, this coating has an exteremely sharp transmission in the green portion of the spectra and is useful as a light filter. This dye is not only useful in tinting cellulose acetate or nitrate, but other film base materials to give a green film base.

EXAMPLE X

*2,4-dianisyl-4'-dimethylamino-6-styrylpyrylium sulfoacetate*

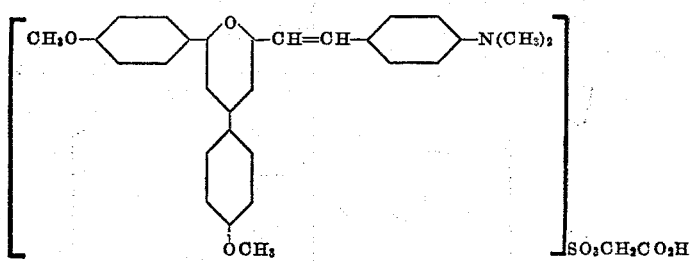

A mixture of 4.4 parts of 2,4-dianisyl-6-methylpyrylium sulfoacetate (Schneider and Seebach, loc. cit.), 1.5 parts of p-dimethylaminobenzaldehyde and 25 parts by volume of methanol was boiled for ten minutes. The dye crystals separate immediately and were purified by boiling-out with methanol. This dye forms a green gelatin coating suitable as a light filter or as a tinting dye for film base.

EXAMPLE XI

*2,4-diphenyl-4'-diethylamino-6-styrylpyrylium sulfoacetate*

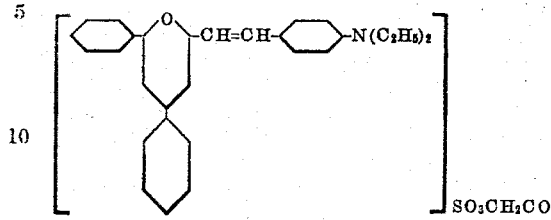

A mixture of 1.5 parts of 2,4-diphenyl-6-methylpyrylium sulfoacetate, 0.6 part of p-diethylaminobenzaldehyde and 15 parts by volume of methanol was boiled for ten minutes. The dye was precipitated by the addition of ether to yield 1.1 parts of a viscous semi-solid. This material which is very soluble in methanol and ethyl alcohol (95%) is suitable for use as a dye for alkali or water soluble resin coatings. When incorporated in an alkali-soluble synthetic resin coating a clear deep green color is obtained. On immersion in photographic developer solution the coating is dissolved, the dye being destroyed to yield a colorless solution and a clear colorless film base. An agent such as methyl lauryl phosphate may be incorporated in the coating to aid in the penetration of the developer solution.

EXAMPLE XII

*4'-hydroxy-2-styrylbenzopyrylium acetate*

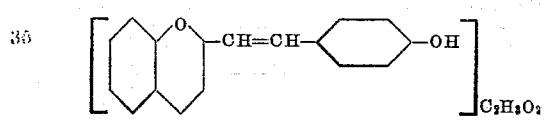

One and six-tenths parts of o-hydroxybenzalacetone was dissolved in 15 parts by volume of acetic acid by warming and then treated with about ½ part by volume of concentrated hydrochloric acid followed by warming for two minutes on the steam bath. To the warmed mixture, 1.3 parts of p-hydroxybenzaldehyde was added followed by 5 parts by volume of acetic anhydride. The mixture was then warmed for five minutes on the steam bath and the solvent removed by vacuum distillation, the temperature of the bath being kept below 70° C. The residue was washed with ether and then dissolved in about 5 parts by volume of isopropyl alcohol. This dye solution mixes readily with a resin coating solution. The coating is deep bluish-purple in color.

EXAMPLE XIII

*7-hydroxy-4'-methoxy-4-styryl-2-phenylbenzopyrylium acetate*

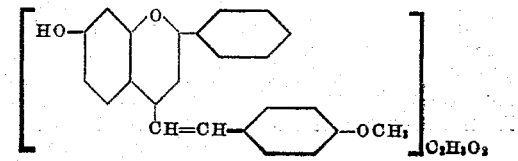

A mixture of 28 parts of p-anisaldehyde, 55 parts of 7-hydroxy-4-methyl - 2-phenylbenzopyrylium chloride, 200 parts by volume of acetic acid and 80 parts by volume of acetic anhydride was refluxed (oil bath) for thirty minutes. The reaction mixture was vacuum-distilled at a bath temperature of 60-70°, 215 parts by volume of distillate being obtained. The residue was stirred with two 100 parts by volume portions of ether and the ether decanted. The resulting semi-solid mass was dissolved in isopropyl alcohol to a dye concentration of 40%. There was thus obtained 170 parts of solution. The isopropyl alcohol dye solution was added to an alcoholic solution of an alkali-soluble resin and coated. The color of the coating is purple to blue.

EXAMPLE XIV

4'-hydroxy-3'-methoxy-2-styrylbenzopyrylium acetate

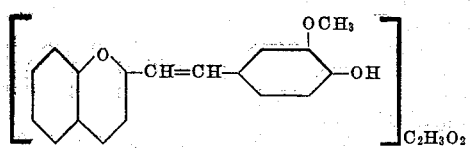

A mixture of 53.0 parts of o-hydroxybenzalacetone and 200 parts by volume of acetic acid was warmed on the steam bath for several minutes to effect solution. Then, 20 parts by volume of concentrated hydrochloric acid was added and warming continued for several minutes. To the warmed mixture, 62 parts of vanillin was added and the mixture warmed to effect solution. Finally, 100 parts by volume of acetic anhydride was added slowly in small portions (exothermic reaction). The reaction was completed by heating on the steam bath for ten minutes and then 290 parts by volume of solvent removed by vacuum distillation, the bath temperature being kept below 70° C. The residue was washed with several portions of ether, and the resulting dye dissolved in isopropyl alcohol to yield a 40% solution. A yield of 250 parts of solution was obtained. This solution is compatible with an alkali-soluble resin coating solution to give a deep purple color.

EXAMPLE XV 4,6-diphenyl-2-methylpyrylium sulfoacetate

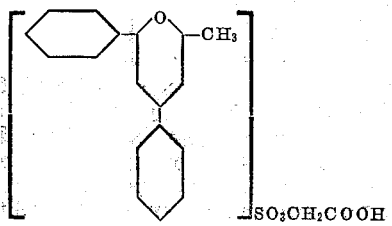

This compound was prepared according to the method of Schneider, Ber., 54, 2289 (1921), by adding 30 parts by volume of acetophenone to a solution of sulfoacetic acid (prepared by treating 100 parts by volume of acetic anhydride with 30 parts by volume of sulfuric acid) and the resulting solution heated at 45°-50° for twenty-four hours. After cooling, an equal volume of ethyl alcohol (95%) was added and crystallization allowed to take place in the cold overnight. The crude product was crystallized from ethyl alcohol. This dye forms yellow layers which are useful as light filters.

EXAMPLE XVI 2-(phenylbutadienyl)-4,6-diphenylyrylium sulfoacetate

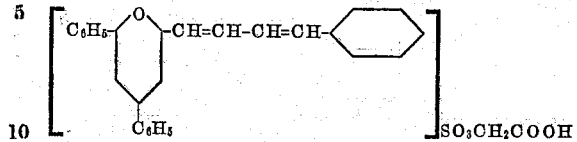

A mixture of 3.7 parts of 4,6-diphenyl-2-methylpyrylium sulfoacetate, 1.4 parts of cinnamaldehyde, 5 parts by volume of acetic acid, and 5 parts by volume of acetic anhydride was boiled for about ten minutes. The dye was precipitated from the cooled solution by the addition of ether. This product is readily soluble in resin coating solutions and results in red layers. The color is readily discharged by photographic processing solutions.

EXAMPLE XVII 4-(p-dimethylaminophenylbutadienyl)-7-hydroxy-2-phenylbenzopyrylium chloride

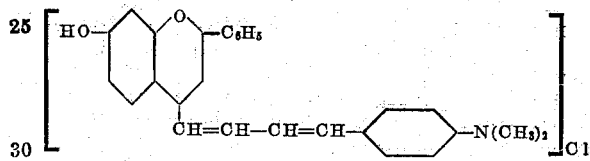

A mixture of 0.9 part of 7-hydroxy-4-methyl-2-phenylbenzopyrylium chloride, 0.6 part of p-dimethylaminocinnamaldehyde, 7 parts by volume of acetic acid and 7 parts by volume of acetic anhydride was heated at reflux for thirty minutes. After cooling, the dye was precipitated with ether. This dye yields green coatings, the color of which is discharged by photographic processing solutions.

The following example is illustrative of method which I have found suitable for changing the color of the pyrylium dye salts disclosed herein and their use as filter and anti-halation dyes.

*Example XVIII*

A coating solution was prepared by mixing the following ingredients in the order listed:

(1) 80 parts by volume of an 8% aqueous solution of gelatin.

(2) 10 parts by volume of 0.4% aqueous solution of a sulfated oleic acid (or any one of the other surface active agents referred to above).

(3) 5 parts by volume of a 1.5% methanol solution of 4-(4'-dimethylaminostyryl)-7-hydroxy-2-phenylbenzopyrylium chloride (Example I).

(4) 10 parts by volume of a 0.4% aqueous solution of sodium perchlorate.

The mixture changes from blue to yellow on addition of sodium perchlorate. The resulting solution was coated on a film base to give a yellow coating.

Other salts such as potassium iodide or ammonium thiocyanate also result in a yellow coating when substituted for sodium perchlorate in the above formula. The shade of color can be varied from yellow to yellow-green to blue-green by varying the amount of salt added. Similarly, the shade of color of the other pyrylium dye salts disclosed herein may be varied by this procedure.

In preparing colloidal coatings, various surface active agents, plasticizers, etc. may be used as is the common practice in the photographic industry. It should be noted that the pH of the colloidal coating composition need to be adjusted to suit the particular pyrylium dye salt used. In general, increased stability is obtained at a lower pH. Changes in pH may be advantageously employed to change the shade of color.

For the production of anti-halation coatings, the pyrylium dye salts of the present invention are incorporated into a water permeable colloidal carrier, and the dispersions thus obtained cast in a known manner as an intermediate layer between the support and the emulsion or as a backing layer on the rear surface of the emulsion support, or as a top coat on the emulsion when the material is intended to be exposed through the support.

The concentration of pyrylium dye salt used according to the present invention will vary somewhat depending upon the color desired. In general, the amount of pyrylium dye salt will vary from about 1 to 2 grams per kilogram of an 8-10% aqueous solution of gelatin or other suitable colloidal media in the preparation of anti-halation layers. In the preparation of light filters and colored film bases, the concentration will depend upon the intensity of the color desired, and can be readily determined by a few practical experiments.

In the accompanying drawing the various figures are enlarged section views of photographic elements having filter and anti-halation layers made according to my invention.

As shown in Figure 1, the support 1 is provided with an anti-halation layer 3, containing a pyrylium dye salt. The light-sensitive emulsion layer 2 is attached to the anti-halation layer 3.

Figure 2:
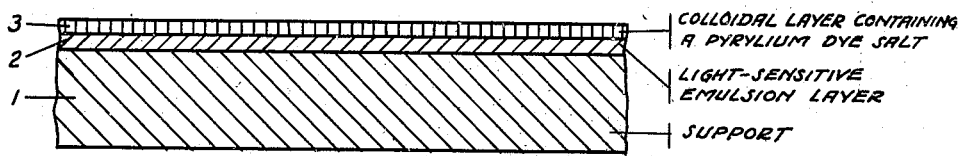

Figure 2 illustrates a film in which the support 1 is coated with a light-sensitive emulsion layer 2, and on the latter side there is provided a filter layer 3 containing a pyrylium dye salt.

Figure 3:
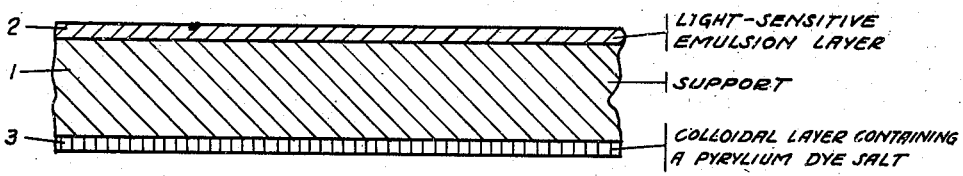

Figure 3 illustrates a film of which the support 1 bears on one side the light-sensitive emulsion layer 2, and on the other side an anti-halation layer 3 containing a pyrylium dye salt.

Figure 4:
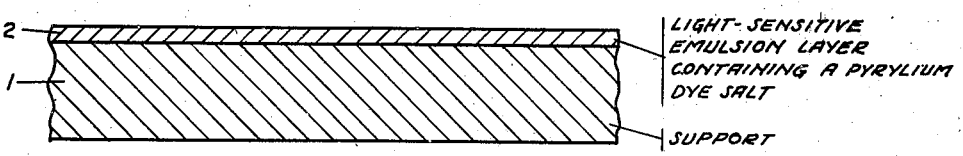

Figure 4 illustrates a film or plate of which the support 1 is provided with the light-sensitive emulsion layer 2 containing as a filter dye a pyrylium dye salt.

The filter and anti-halation coatings prepared as described above have been found to have particularly good filter and anti-halation properties and to have no effect on the normal keeping properties of the light-sensitive layers.

It will be understood that where in the claims appended hereto the term "filter layer" is used that such is intended to include anti-halation layer.

While the present invention has been decribed in considerable detail with reference to certain preferred procedures, materials and uses, it is understood that the class of pyrylium dye salts and their use as filter and anti-halation dyes is not limited thereto and that numerous variations and modifications described in the foregoing specification may be made. As for example, a mixture of two or more pyrylium dye salts may be incorporated in a layer to obtain different shades or increased neutral density. It is also understood that colloidal media dyed with pyrylium dye salts may be coated on one or more of multilayer elements employed for color photography, which usually comprises a base coated with two or three light-sensitive emulsions, each of which records on of the desired spectral regions.

I claim:
1. A light sensitive photographic element comprising a base and a silver-halide emulsion carried thereby, said element having a water-permeable colloidal layer containing a dispersion of a pyrylium dye salt of the class consisting of those of the following formulae:

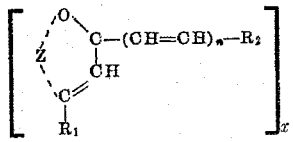

and

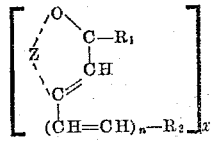

wherein $R_1$ represents a member selected from the class consisting of hydrogen, alkyl, and aromatic groups, $R_2$ is an aromatic radical, Z represents the atoms necessary to complete a pyrylium ring structure, X represents an acid radical, and $n$ represents a member selected from the class consisting of 0, 1 and 2.

2. A light sensitive photographic element comprising a base and a silver-halide emulsion carried thereby, said element having a water-permeable colloidal layer containing a dispersion of a pyrylium dye salt of the following formula:

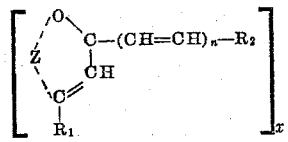

wherein $R_1$ represents a member selected from the class consisting of hydrogen, alkyl, and aromatic groups, $R_2$ represents an aromatic radical, Z represents the atoms necessary to complete a pyrylium ring structure, X represents an acid radical, and $n$ represents a member selected from the class consisting of 0, 1 and 2.

3. A light sensitive photographic element comprising a base and a silver-halide emulsion carried thereby, said element having a water-permeable colloidal layer containing a dispersion of a pyrylium dye salt of the following formula:

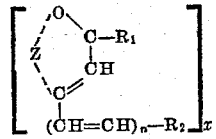

wherein $R_1$ represents a member selected from the class consisting of hydrogen, alkyl, and aromatic groups, $R_2$ represents an aromatic radical, Z represents the atoms necessary to complete a pyrylium ring structure, X represents an acid radical, and $n$ represents a member selected from the class consisting of 0, 1 and 2.

4. A light sensitive photographic element comprising a base and a silver-halide emulsion carried thereby, said element having a water-permeable colloidal layer containing a dispersion of a pyrylium dye salt of the following formula:

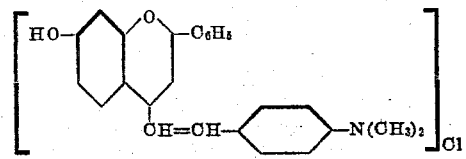

5. A light sensitive photographic element comprising a base and a silver-halide emulsion carried thereby, said element having a water-permeable colloidal layer containing a dispersion of a pyrylium dye salt of the following formula:

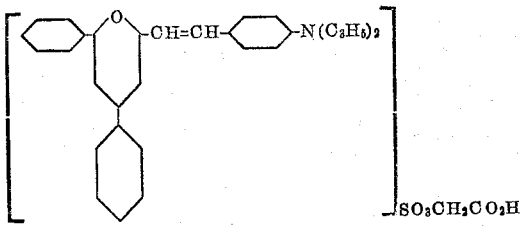

6. A light sensitive photographic element comprising a base and a silver-halide emulsion carried thereby, said element having a water permeable colloidal layer containing a dispersion of a pyrylium dye salt of the following formula:

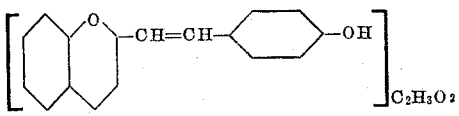

7. A light-sensitive photographic film having at least one silver-halide emulsion layer and at least one filter layer consisting of a water-permeable colloidal carrier having dispersed therein, as the active filtering medium, a dye salt of the class consisting of those of the following formulae:

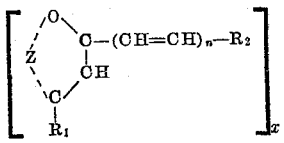

and

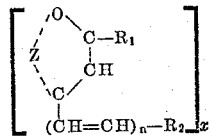

wherein $R_1$ represents a member selected from the class consisting of hydrogen, alkyl, and aromatic groups, $R_2$ is an aromatic radical, Z represents the atoms necessary to complete a pyrylium ring structure, X represents an acid radical, and $n$ represents a member selected from the class consisting of 0, 1 and 2.

8. A light-sensitive photographic film having at least one silver-halide emulsion layer and at least one filter layer consisting of a water-permeable colloidal carrier having dispersed therein, as the active filtering medium, a dye salt of the formula:

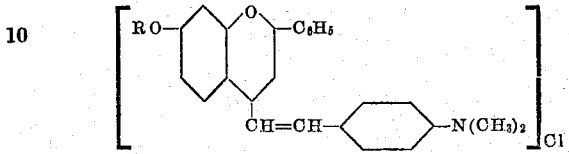

9. A light-sensitive photographic film having at least one silver-halide emulsion layer and at least one filter layer consisting of a water-permeable colloidal carrier having dispersed therein, as the active filtering medium, a dye salt of the formula:

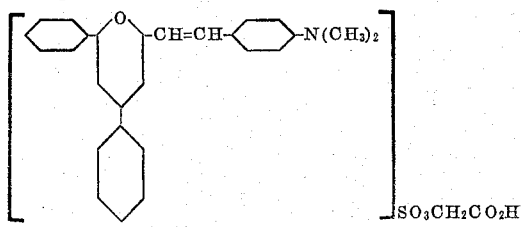

THOMAS R. THOMPSON.

REFERENCES CITED

The following references are of record in the file of this patent:

UNITED STATES PATENTS

| Number | Name | Date |
|---|---|---|
| 1,817,963 | Capstaff | Aug. 11, 1931 |
| 1,845,404 | Durr et al. | Feb. 16, 1932 |
| 1,900,877 | Hickman | Mar. 7, 1933 |
| 1,962,310 | Jones | June 12, 1934 |

OTHER REFERENCES

Journal of the Chemical Society (London) vol. 127 (1925), pages 685–696; vol. 121 (1922), pages 1198–1212, 1926, pages 1902–1906.

Berichte Der Deutsche Chemische Gesellschaft, vol 54B (1921), pages 2285–2298.

Certificate of Correction

Patent No. 2,461,484.  February 8, 1949.

THOMAS R. THOMPSON

It is hereby certified that errors appear in the printed specification of the above numbered patent requiring correction as follows:

Column 2, lines 45, 46 and 47, and column 13, lines 34, 35 and 36, claim 7, for that portion of each formula reading

column 7, line 47, for "exteremely" read *extremely*; column 10, line 3, Example XVI, for "diphenylyrylium" read *diphenylpyrylium*; column 11, line 74, for the words "records on" read *records one*; column 13, line 6, claim 5, for "N(C₃H₅)₂" read *N(CH₃)₂*; lines 42, 43 and 44, claim 7, for

column 14, line 10, claim 8, for "RO" read *HO*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*